(12) United States Patent  (10) Patent No.: US 7,153,434 B1
Dennis                     (45) Date of Patent:     Dec. 26, 2006

(54) METHODS FOR REMOVING CONTAMINANTS FROM WATER AND SILICA FROM FILTER MEDIA BEDS

(75) Inventor: Richard S. Dennis, Tampa, FL (US)

(73) Assignee: Severn Trent Water Purification, Inc., Colmar, PA (US)

( * ) Notice: Subject to any disclaimer, the term of this patent is extended or adjusted under 35 U.S.C. 154(b) by 0 days.

(21) Appl. No.: 11/478,020

(22) Filed: Jun. 29, 2006

(51) Int. Cl.
C02F 1/42 (2006.01)

(52) U.S. Cl. .................. 210/670; 210/673; 210/688

(58) Field of Classification Search .............. 210/670, 210/673, 681–688
See application file for complete search history.

(56) References Cited

U.S. PATENT DOCUMENTS 4,056,146 A * 11/1977 Hall .......................... 166/300
5,403,495 A    4/1995 Kust et al.
5,965,027 A *  10/1999 Allen et al. .................. 210/638
6,200,482 B1 * 3/2001 Winchester et al. ........ 210/681

OTHER PUBLICATIONS

Waltham, Catherine and Eick, Matthew, Kinetics of Arsenic Adsorption on Goethite in the Presence of Sorbed Silicic Acid, Soil Science Society of America Journal, May 2002, 66:818-825 (2002), USA.

* cited by examiner

Primary Examiner—Chester T. Barry
(74) Attorney, Agent, or Firm—D'Ambrosio & Associates, PLLC; Jo Katherine D'Ambrosio, J.D.

(57) ABSTRACT

The method for removing silicon dioxide from a contaminant-removal media bed comprises adding a scrub solution containing an acidic solution of sodium fluoride to a media bed containing silicon dioxide. The scrub solution is allowed to remove the silicon dioxide before the scrub solution is removed from the bed.

26 Claims, 1 Drawing Sheet

METHODS FOR REMOVING CONTAMINANTS FROM WATER AND SILICA FROM FILTER MEDIA BEDS

FIELD OF THE INVENTION

This invention relates to an apparatus and method for removing contaminants from water. More specifically, this invention relates to an apparatus and method for removing contaminants from water containing silicon dioxide.

BACKGROUND

Ground water is used as the drinking water source in communities throughout out the world. Ground water is often cleaner than surface water because ground water typically contains lower levels of organic matter and pollutants. However, ground water can include many contaminants such as mercury, arsenic, fluoride, and lead.

Arsenic, for example, is a known carcinogen which is found in elevated concentrations in many ground water sources. In the United States, the Environmental Protection Agency has implemented a maximum concentration limit of 10 micrograms of arsenic per liter for drinking water. Therefore, it is often necessary to remove arsenic from drinking water.

An adsorption process is one method used to remove arsenic and other water soluble contaminants from a water source. Typically, the adsorption process contacts the contaminant-containing water with a solid media. The contaminant has greater affinity for the media than for the water. The contaminant bonds to the solid media and is removed from the water. Iron hydroxide, aluminum hydroxide, cupric hydroxide, titanium oxide, and manganese oxide are examples of contaminant-removal media. Periodically, the media is taken off-line and backwashed with water to reclassify the media bed and reduce flow restrictions in the bed.

In addition to contaminants, silicon dioxide ($SiO_2$), also known as silica, is also present in many ground water sources. Silicon dioxide has been found to act as an interferent to the adsorption process. Silicon dioxide can reduce the media adsorptive capacity by 25% to 75%. It is believed that silicon dioxide polymerizes and forms a coating on the surface of the adsorption media. The silicon dioxide coating reduces the contact area between the contaminant-containing water and the pores in the adsorption media where adsorption occurs. Thus, the adsorptive capacity of the media is reduced. Consequently, it is desirable to remove the silicon dioxide from the adsorption bed to increase the adsorptive capacity of the bed.

DEFINITIONS

For the purposes of this invention, silica is defined as silicon dioxide ($SiO_2$).

For the purposes of this invention, contaminant is defined as any substance present in water that a human desires to remove.

SUMMARY

In one or more embodiments of the present invention, an apparatus and method are provided for removing contaminants from water which contains silicon dioxide. The apparatus and method employ an acidic solution of sodium fluoride to remove the silicon dioxide interfering with contaminant removal.

In a first embodiment, the apparatus of the invention comprises one or more media beds comprising contaminant-removal media. A water feed stream is in fluid communication with the media bed. A scrub solution feed stream comprising an acidic solution of sodium fluoride is also in fluid communication with the media bed.

In a second embodiment, the apparatus comprises one or more media beds comprising contaminant-removal media, a water feed stream in fluid communication with the media beds, and a scrub solution feed stream. The scrub solution feed stream comprises an acidic solution of sodium fluid and is also in fluid communication with the media beds. The acidic solution of sodium fluoride comprises sodium fluoride and an acid selected from a group consisting essentially of hydrochloric acid, sulfuric acid, nitric acid, and combinations thereof. A reagent tank is in fluid communication with the scrub solution feed stream. The reagent tank contains the acidic solution of sodium fluoride. A reagent dosing pump is in fluid communication with both the reagent tank and the scrub solution feed stream.

In a first embodiment of the method for removing silicon dioxide from the media bed, the method comprises adding a scrub solution to a media bed containing silicon dioxide. The scrub solution comprises an acidic solution of sodium fluoride. The scrub solution is allowed to remove the silicon dioxide from the media. Once the silicon dioxide is removed from the media, the scrub solution, now containing the silicon dioxide, is removed from the media bed.

In a second embodiment, the method comprises forming an acidic solution of sodium fluoride by mixing sodium fluoride with an acid selected from a group consisting essentially of hydrochloric acid, sulfuric acid, nitric acid, and combinations thereof. A scrub solution is formed by mixing the acidic solution of sodium fluoride with a stream of water. The pH level of the scrub solution is controlled to within a range of from about 3.0 pH to about 6.0 pH by dosing the acidic solution of sodium fluoride to the stream of water with a pump and controlling the speed of the pump to maintain the pH level. The media bed is backwashed with the scrub solution at a specific velocity ranging about 6 gallons per minute per square foot of cross-sectional area of the media bed to about 10 gallons per minute per square foot of cross-sectional area of the media bed. The scrub solution is allowed to remove the silicon dioxide by soaking the media bed within the scrub solution for a period ranging from about 0.5 minutes to about 30 minutes. The scrub solution containing the silicon dioxide is removed from the bed and the media bed is flushed with water.

DETAILED DESCRIPTION

Figure 1:
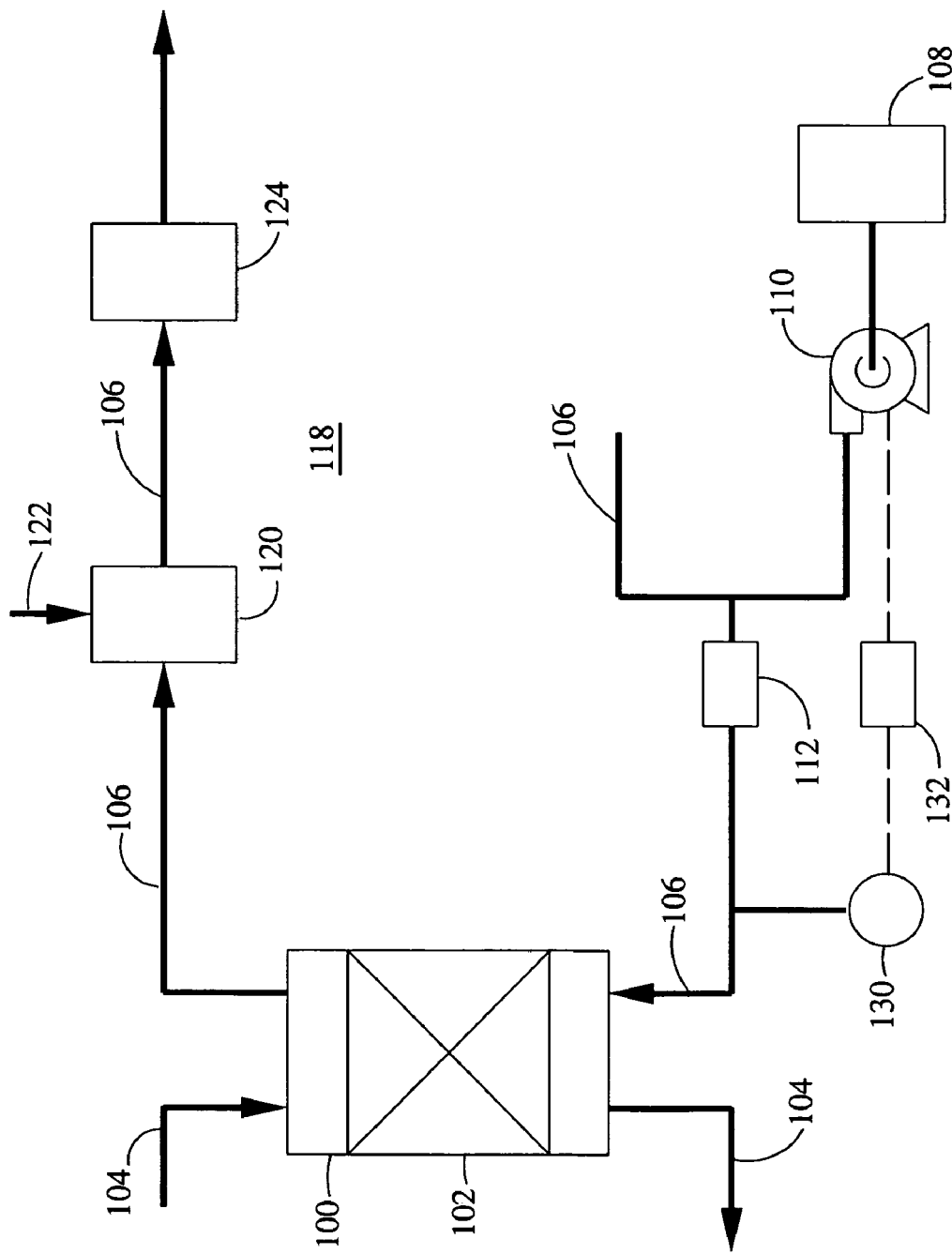
FIG. 1 is a schematic of the apparatus for removing contaminants from water.

During the process of removing contaminants, such as arsenic and mercury, from water, silicon dioxide has been found to interfere with removal of the contaminants. Silicon dioxide is naturally occurring in many ground water sources. When ground water is passed through a bed of adsorption media intended to remove contaminants, it is believed that the silicon dioxide polymerizes on the outside of the adsorption media. The silicon dioxide acts as barrier on the adsorption media's surface between the water and the media's pores. The majority of adsorption occurs in the pores. The silicon dioxide barrier limits the ability of the adsorption media to remove the contaminants from the water. Advantageously, sodium fluoride under acidic conditions reacts with silicon dioxide, thereby removing the silicon dioxide from the media and increasing the adsorption capacity of the media.

Referring now to FIG. 1, a first embodiment of an apparatus for removing contaminants from water is shown. The apparatus comprises one or more media beds 100. The media bed 100 comprises contaminant-removal media 102. A water feed stream 104 is in fluid communication with the media bed 100. A scrub solution feed stream 106 is also in fluid communication with the media bed 100. The scrub solution feed stream 106 comprises an acidic solution of sodium fluoride.

The water feed stream 104 feeds contaminant containing water to the media bed 100 where the water contacts the contaminant-removal media 102. The contaminant-removal media 102 function to remove contaminants from the water feed stream 104. Examples of contaminants that can be removed include, but are not limited to arsenic, lead, mercury, and fluoride. Suitable types of contaminant-removal media 102 include, but are not limited to metal oxides, metal hydroxides, and iron containing media. Specific examples of suitable contaminant-removal media 102 include iron hydroxide, aluminum hydroxide, cupric hydroxide, titanium oxide, manganese oxide, and combinations thereof.

In certain locations, the water feed stream 104 contains silicon dioxide in addition to the contaminants. The silicon dioxide coats the surface of the contaminant-removal media reducing the effectiveness of the media bed in removing the contaminants. The scrub solution feed stream 106 comprises an acidic solution of sodium fluoride (NaF) used to remove the silicon dioxide from the media bed.

The scrub solution feed stream 106 comprising sodium fluoride can be added to the media bed 102 as separate stream or as part of the normal periodic media bed backwash stream. The scrub solution feed stream 106 may also enter the media bed 102 from any direction including the top, bottom, or sides of the media bed.

The acidic solution of sodium fluoride is effective in removing silicon dioxide from the contaminant-removal media. In solution, the sodium fluoride will form fluoride ion. Under acidic conditions, the silicon dioxide and the fluoride ion form a fluosilicate ligand which is water soluble. Advantageously, sodium fluosilicate and free fluoride do not create a hazardous waste solution. The silicon dioxide dissolution process is believed to occur according to the following reaction:

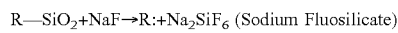

$R-SiO_2 + NaF \rightarrow R: + Na_2SiF_6$ (Sodium Fluosilicate)

"R" denotes the contaminant-removal media.

The acidic solution of sodium fluoride, the scrub solution, comprises sodium fluoride and an acid. In one embodiment, the acidic solution of sodium fluoride is prepared using NSF 60 approved sodium fluoride and an acid. Any acid may be used in the acidic solution of sodium fluoride. In certain embodiments, acids with non-toxic by-products can be employed to form the sodium fluoride solution. Suitable acids include, but are not limited to, hydrochloric acid, sulfuric acid, nitric acid, and combination thereof.

In a further embodiment of the invention, the apparatus also includes a reagent tank 108 in fluid communication with the scrub solution feed stream 106. The reagent tank 108 contains the acidic solution of sodium fluoride. A reagent dosing pump 110 can also be included in the apparatus. The reagent dosing pump 110 is in fluid communication with the reagent tank 108 and the scrub solution feed stream 106. The apparatus can also include a static mixer 112. The static mixer 112 is in fluid communication with the dosing pump 110 and the scrub solution feed stream 106. The static mixer 112 facilitates the mixing of the acidic solution of sodium fluoride leaving the dosing pump 110 and the scrub solution feed stream 106.

When the acidic solution of sodium fluoride is mixed with the scrub solution feed stream 106, the scrub solution feed stream 106 can comprise fluoride ion in a range of about 0.1 weight percent to about 1.5 weight percent fluoride ion. In some embodiments, the scrub solution feed stream has a pH level in a range of about 3.0 pH to about 6.0 pH when the acidic solution of sodium fluoride is mixed with the scrub solution feed stream. In a further embodiment of the invention, the pH level in scrub solution feed stream is controlled by measuring the pH level in the scrub solution feed stream with a pH meter 130 and controlling the speed of the dosing pump 110 in response to the pH measurement with a controller 132.

In yet another embodiment, the apparatus further comprises a fluoride treatment system 118 in fluid communication with the media bed 100. In one embodiment of the fluoride treatment system, the system comprises a precipitation tank 120, a calcium chloride feed stream 122 in fluid communication with the precipitation tank 120, and a filter 124 in fluid communication with the precipitation tank 120. In this embodiment, the fluoride treatment system 118 forms a calcium fluoride precipitate that is removed from the scrub solution feed stream 106 so that the backwash stream can be re-introduced to the environment. After removing the silicon dioxide from the media bed 100, the scrub solution feed stream 106 enters the fluoride treatment system 118. In the precipitation tank 120, a calcium chloride feed stream 122 is added to the scrub solution feed stream 106. The calcium chloride reacts with the sodium fluosilicate to form calcium fluoride which precipitates out of the scrub solution feed stream 106. The scrub solution feed stream 106 containing calcium fluoride then enters the filter 124 where the calcium fluoride precipitate is filtered out of the scrub solution feed stream 106.

Silicon dioxide, silica, in a water source can act as an interferent to the adsorption process by coating the contaminant-removal media 102 in a media bed 100. The method of this invention comprises removing silicon dioxide from a media bed 100. In one embodiment, a scrub solution is added to the media bed 100 containing silicon dioxide. The scrub solution comprises an acidic solution of sodium fluoride. The scrub solution is allowed to remove the silicon dioxide that coats the media 102. Once the silicon dioxide is removed from the media 102, the spent scrub solution containing the silicon dioxide is removed from the media bed 100. Methods of removing the spent scrub solution from the media bed 100 include, but are not limited to, pumping out the scrub solution and draining the scrub solution from the bed. The method can further include stopping all liquid flows to the media bed before adding the scrub solution.

In a further embodiment of the method for removing contaminants from water, the method includes rinsing the contaminant-removal media bed 100 with water before resuming feeding the flow of water 104 to the contaminant-removal media bed 100. Flushing the media bed with water rinses the scrub solution and the silicon dioxide from the media bed.

The scrub solution may be added to the media bed in any manner known in the art. Suitable ways of adding the scrub solution include adding the scrub solution either concurrent to the direction of the water feed stream 104 or countercurrent to the water feed stream flow 104. Adding the scrub solution in the opposite direction of the water feed stream 104 is also known as backwashing the media bed. Backwashing is often performed at set intervals of time or after certain volumes of feed water have passed through the media bed. For the purposes of this method, backwashing may be performed at any desired interval. However, in some embodiments of the method, backwashing is performed at intervals ranging from once a month to once every three months. The scrub solution may be backwashed through the media bed alone or as part of the regular backwash of the media bed to reduce flow restrictions in the media bed.

While it should be understood that the scrub solution may be added to the media bed at any rate, in one embodiment of the method, the scrub solution is added at a specific velocity proportional to the size of the media bed 100. The specific velocity ranges from about five gallons per minute per square foot of the cross-sectional area of the media bed (gal/min.ft$^2$)(12 m$^3$/m$^2$.hr) to about ten gallons per minute per square foot of cross-sectional area of the media bed (24 m3/m2.hr).

The scrub solution may be obtained from any suitable source. In one embodiment, the scrub solution is formed by mixing an acidic solution of sodium fluoride with a stream of water 106. This embodiment can further comprise controlling the pH level of the scrub solution. The pH is controlled by dosing the acidic solution of sodium fluoride to the stream of water 106 with a pump 110 and controlling the speed of the pump 110 to maintain the pH level. Suitable pH levels include, but are not limited to pH levels ranging from about 3.0 pH to about 6.0 pH. This pH range is advantageous because fluosilicate can decompose at pH levels above 6 and the metal oxides which form the media can dissolve at pH levels below 3. The scrub solution can also comprise fluoride ion present in an amount ranging from about 0.1 weight percent to about 1.5 weight percent.

The acidic solution of sodium fluoride in the scrub solution may also be obtained from any source. In one embodiment of the method, the acidic solution of sodium fluoride is formed by mixing sodium fluoride with an acid. Suitable acids include, but are not limited to, hydrochloric acid, sulfuric acid, nitric acid, and combinations thereof. The acid used to form the acidic solution of sodium fluoride can be selected to reduce the amount of toxic by-products produced by the acid.

The concentration of fluoride ion in the scrub solution may also be controlled. To control the concentration of fluoride ion in the scrub solution, the acidic solution of sodium fluoride is dosed into the stream of water 106 with a pump 110. The speed of the pump 110 is controlled to maintain the concentration of fluoride ion in the scrub solution. Suitable concentrations of fluoride ion include, but are not limited to concentrations ranging from about 0.1 weight percent to about 1.5 weight percent.

The scrub solution can be allowed to remove the silicon dioxide from the media 102 in any suitable manner known in the art. Suitable ways of removing the silicon dioxide include, but are not limited to, continuously flowing the scrub solution through the media bed 100 or allowing the media bed 100 to soak in the scrub solution. While the soak may last for any period of time, suitable soak times range from about 0.5 to about 30 minutes. In one embodiment, the media bed 100 is allowed to soak after a volume of scrub solution equal to about 1.5 times the volume of the media bed has been added to the media bed.

In yet another embodiment of the method for removing silicon dioxide from the media bed 100, the method further comprises treating the scrub solution containing the silicon dioxide with calcium chloride after the scrub solution is removed from the media bed 100. The calcium chloride reacts with the fluoride in scrub solution to form calcium fluoride which precipitates out of the scrub solution. The calcium fluoride precipitate can then be removed from the scrub solution so that the scrub solution may be released into the environment.

Still another embodiment of a method for removing a contaminant from water comprises feeding a flow of water 104 to a contaminant-removal media bed 100. The flow of water 104 the contaminant-removal media bed 100 is periodically stopped. The contaminant-removal media bed 100 is then backwashed with a scrub solution comprising an acidic solution of sodium fluoride to remove silicon dioxide from the bed 100. The contaminant-removal media bed 100 is allowed to soak in the scrub solution. The scrub solution is then removed from the contaminant-removal media bed 100, and the flow of water 104 to the contaminant-removal media bed 100 is resumed. While this method may employ any type of contaminant-removal media bed, in one embodiment of the method, the contaminant-removal media bed is an arsenic removal bed.

EXAMPLE 1

An experiment was performed to determine whether the adsorptive capability of spent Bayoxide® E33 media could be improved by use of an off-line media conditioning technique.

The spent Bayoxide® E33 arsenic removal media was taken from Anthony, N. Mex. where it was used to treat water containing 38 ppm SiO$_2$. The spent media had been in service for approximately 55,000 bed volumes (BV) when it was removed.

A two-part test was performed on two separate samples of spent media, Sample A and Sample B. In the first part of the test, Sample A was treated with a 3.9 pH acidic scrub solution of sodium fluoride (NaF) containing 1% fluoride ion (F). Sample B was treated with a 5.2 pH acidic scrub solution of sodium fluoride (NaF) containing 1% fluoride ion (F). In the second part of the test, treated media Samples A and B and an untreated Reference Sample was used to remove arsenic from a water source. The adsorption capacity of the three samples was then measured.

Treatment Procedure 300 mL of each of sample was backwashed with water to remove loose solids, or fines, from the samples. 75 mL of each sample was then placed in separate 1.9 cm I-X column. Each sample column was first filled with the respective scrub solution, 3.9 pH for Sample A and 5.2 pH for Sample B. 35 mL of entrained water was then drained and discarded from each column. Next, the remaining scrub solution was then allowed to stand in the column for 15 minutes. Afterwards, 300 mL of the scrub solution was circulated through the column for 15 minutes at a rate of 25 mL/min. Each column was then flushed with 225 mL of deionized water.

The spent scrub solution was drained from the column and collected for analysis. The arsenic level of each sample's scrub solution was measured by laboratory analysis. The measured arsenic level represents the amount arsenic dissolved from the media by the scrub solution during treatment.

Adsorption Testing Procedure

To determine the effect of the scrub solution on the arsenic adsorption capability the media, arsenic spiked water containing a known level of arsenic was flowed through treated Samples A and B and through an untreated Reference Sample of the media. The arsenic level of the spiked water exiting the Sample columns was then measured to determine the adsorption capacity of the treated media in comparison to the untreated media.

50 mL columns of treated Sample A, Sample B, and the Reference Sample were prepared. The Reference Sample was rinsed with water to remove fines. 4 L of arsenic spiked water containing 11.000 mg/L arsenic was set up to flow through each column at a rate of 25 mL/min. Each test lasting nearly 5 hours. Specimens of the treated water were taken for analysis at 5, 30, and 120 minutes of test duration. At the end of the test, a further specimen was taken of all the treated water to determine a composite adsorption capacity of each media sample.

Test Results

In part one, the waste 3.9 pH and 5.2 pH scrub solutions used to treat Samples A and B respectively were analyzed to determine their arsenic content. This measured arsenic content represents the amount of arsenic dissolved by the scrub solutions during treatment of the silicon dioxide coated media. It is important that dissolved arsenic be kept to a minimum in the waste scrub, so that a potentially hazardous waste solution is not created by the scrub solutions. The waste 3.9 pH scrub solution used to treat Sample A contained an arsenic level of 0.050 mg/L. The 5.2 pH scrub solution used to treat Sample B contained an arsenic level of 0.068 mg/L. The measured arsenic levels of both the 3.9 pH and 5.2 pH waste scrub solutions were relatively low and did not create a hazardous waste condition. The results for part one are presented in Table 1.

TABLE 1

Dissolved Arsenic in Spent Scrub Solutions

| Scrub Solution (pH) | Arsenic Level (mg/L) |
| --- | --- |
| 3.9 pH Scrub Solution | 0.050 |
| 5.2 pH Scrub Solution | 0.068 |

The adsorption capacity of samples of the treated media and the untreated media were tested by measuring the arsenic level treated water originally having 11.000 mg/L arsenic capacity. The part two results of adsorption testing of the treated media and the untreated reference sample are listed in Table 2.

TABLE 2

Arsenic Adsorption of 11.000 mg/L Arsenic Spiked Water by Treated Media

| Media Sample | Arsenic Level (mg/L) of Treated Water at Test Durations of | | | |
| --- | --- | --- | --- | --- |
| | 5 Min. | 30 Min. | 120 Min. | Composite |
| Sample A (3.9 pH Treated Media) | 0.005 | 0.005 | 0.005 | 0.005 |
| Sample B (5.2 pH Treated Media) | 0.009 | 0.200 | 0.006 | 0.044 |
| Reference Sample (Untreated Media) | 0.110 | 3.700 | 5.800 | 5.300 |

Over the duration of the test, media Sample A, the 3.9 pH scrub solution treated media, adsorbed all but 0.005 mg/L arsenic of the 11.000 mg/L originally present in the arsenic spiked water. Likewise, Sample B, treated with the 5.2 pH scrub solution, adsorbed all but 0.044 mg/L arsenic over the entire duration of the test.

Treated Samples A and B were significantly more effective at removing arsenic from the spiked water than the untreated Reference Sample. The arsenic level for the spiked water treated with the Reference Sample media after the duration of the test was 5.300 mg/L. The scrub solution treated media Samples A and B absorbed greater than 99.5% of the arsenic present while the untreated Reference Sample only absorbed about 52% of the arsenic.

The test results indicate that both the 3.9 pH and 5.2 pH acidic scrub solutions of sodium fluoride (NaF) containing 1% fluoride ion (F) were effective at removing the silicon dioxide present on the adsorption media. The scrub treated media removed greater amounts of arsenic that the untreated media. In addition, the scrub solutions did not dissolve dangerous amount of arsenic from the media.

While the invention has been described with reference to several embodiments, it will be understood by those skilled in the art that various changes in form and detail may be made therein without departing from the spirit and scope of the invention.

The invention claimed is:

1. A method for removing silicon dioxide from a contaminant-removal media bed comprising the steps of:
adding a scrub solution to a media bed containing silicon dioxide, the scrub solution comprising an acidic solution of sodium fluoride;
allowing the scrub solution to remove the silicon dioxide; and
removing the scrub solution containing the silicon dioxide from the media bed.

2. The method of claim 1 wherein the scrub solution is added at a specific velocity ranging from about 5 gallons per minute per square foot of the cross-sectional area of the media bed to about 10 gallons per minute per square foot of cross-sectional area of the media bed.

3. The method of claim 1 wherein the step of adding the scrub solution to the bed comprises backwashing the media bed with the scrub solution.

4. The method of claim 1 wherein the backwashing is performed at intervals ranging from once a month to once every three months.

5. The method of claim 1 wherein the method further comprises the step of:
forming the scrub solution by mixing an acidic solution of sodium fluoride with a stream of water.

6. The method of claim 5 wherein the method further comprises the step of controlling the pH level of the scrub solution by dosing the acidic solution of sodium fluoride to the stream of water with a pump and controlling the speed of the pump to maintain the pH level.

7. The method of claim 5 wherein the method further comprises the step of controlling the concentration of fluoride ion in the scrub solution by dosing the acidic solution of sodium fluoride to the stream of water with a pump and controlling the speed of the pump to maintain the concentration of fluoride ion.

8. The method of claim 1 wherein the method further comprises the step of:
allowing the media bed to soak within the scrub solution.

9. The method of claim 8 wherein the bed is allowed to soak after a volume of scrub solution equal to about 1.5 times the volume of the media bed has been added to the media bed.

10. The method of claim 8 wherein the media bed is allowed to soak in the scrub solution for a period ranging from about 0.5 minutes to about 30 minutes.

11. The method of claim 1 wherein the method further comprises the step of:
flushing the media bed with water after removing the scrub solution from the media bed.

12. The method of claim 1 wherein the method further comprises the step of:
stopping all liquid flows to the media bed before adding the scrub solution.

13. The method of claim 1 wherein the scrub solution comprises fluoride ion in concentrations ranging from about 0.1 weight percent to about 1.5 weight percent.

14. The method of claim 1 wherein the scrub solution has a pH level ranging from about 3.0 pH to about 6.0 pH.

15. The method of claim 1 wherein the method further comprises the step of:
forming the acidic solution of sodium fluoride by mixing sodium fluoride with an acid selected from a group consisting essentially of hydrochloric acid, sulfuric acid, nitric acid, and combinations thereof.

16. The method of claim 1 wherein the method further comprises the step of treating the scrub solution containing the silicon dioxide with calcium chloride after the scrub solution is removed from the media bed.

17. A method for removing a contaminant from water comprising:
feeding a flow of water to a contaminant-removal media bed;
periodically stopping the flow water to the contaminant-removal media bed;
backwashing the contaminant removal bed with a scrub solution comprising an acidic solution of sodium fluoride;
allowing the contaminant-removal media bed to soak in the scrub solution;
removing the scrub solution from the contaminant-removal media bed; and
resuming feeding the flow of water to the contaminant-removal media bed.

18. The method of claim 17 wherein the contaminant-removal media bed is an arsenic removal bed.

19. The method of claim 17 wherein the method further comprises the step of rinsing the contaminant-removal media bed with water before resuming feeding the flow of water to the contaminant-removal media bed.

20. The method of claim 17 wherein the scrub solution has a pH level ranging from about 3.0 pH to about 6.0 pH.

21. The method of claim 17 wherein the scrub solution comprises fluoride ion present in an amount ranging from about 0.1 weight percent to about 1.5 weight percent.

22. The method of claim 17 wherein the contaminant-removal media bed is allowed to soak within the scrub solution for 0.5 to 30 minutes.

23. The method of claim 17 wherein the method further comprises the step of:
forming the scrub solution by mixing the acidic solution of sodium fluoride with water.

24. The method of claim 17 wherein the method further comprises the step of:
forming the acidic solution of sodium fluoride by mixing a sodium fluoride and an acid selected from a group consisting of hydrochloric acid, sulfuric acid, nitric acid, and combination thereof.

25. The method of claim 17 wherein the method further comprises the step of:
treating the scrub solution with calcium chloride after the scrub solution is removed from the contaminant-removal media bed.

26. A method for removing silicon dioxide from a media bed comprising the steps of:
forming an acidic solution of sodium fluoride by mixing sodium fluoride with an acid selected from a group consisting of hydrochloric acid, sulfuric acid, nitric acid, and combinations thereof;
forming a scrub solution by mixing the acidic solution of sodium fluoride with a stream of water;
controlling the pH level of the scrub solution within a range of from about 3.0 pH to about 6.0 pH by dosing the acidic solution of sodium fluoride to the stream of water with a pump and controlling the speed of the pump to maintain the pH level;
backwashing the media bed with the scrub solution at a specific velocity ranging about 6 gallons per minute per square foot of cross-sectional area of the media bed to about 10 gallons per minute per square foot of cross-sectional area of the media bed;
allowing the scrub solution to remove the silicon dioxide by soaking the media bed in the scrub solution for a period ranging from about 0.5 minutes to about 30 minutes;
removing the scrub solution containing the silicon dioxide from the bed; and
flushing the media bed with water.

* * * * *